(12) United States Patent
Maedo et al.

(10) Patent No.: US 10,704,579 B2
(45) Date of Patent: Jul. 7, 2020

(54) CONNECTING DEVICE FOR ATTACHMENTS

(71) Applicant: KOBELCO CONSTRUCTION MACHINERY CO., LTD., Hiroshima-shi (JP)

(72) Inventors: Teppei Maedo, Hyogo (JP); Kyohei Iwasa, Hyogo (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 60 days.

(21) Appl. No.: 15/745,279

(22) PCT Filed: Jul. 11, 2016

(86) PCT No.: PCT/JP2016/070371
§ 371 (c)(1),
(2) Date: Jan. 16, 2018

(87) PCT Pub. No.: WO2017/010441
PCT Pub. Date: Jan. 19, 2017

(65) Prior Publication Data
US 2019/0032690 A1    Jan. 31, 2019

(30) Foreign Application Priority Data

Jul. 16, 2015    (JP) .................................. 2015-141812

(51) Int. Cl.
*B66C 23/70* (2006.01)
*F16B 7/04* (2006.01)
(Continued)

(52) U.S. Cl.
CPC ............ *F16B 7/0433* (2013.01); *B66C 23/26* (2013.01); *B66C 23/68* (2013.01); *B66C 2700/0378* (2013.01)

(58) Field of Classification Search
CPC ......... B66C 23/70; B66C 23/76; B66C 23/36; B66C 23/50; B66C 23/365
See application file for complete search history.

(56) References Cited

U.S. PATENT DOCUMENTS 1,941,952 A * 1/1934 Nickles ................... B66C 23/70
212/177
2,975,910 A * 3/1961 Conrad ................... B66C 23/36
212/300

(Continued)

FOREIGN PATENT DOCUMENTS

| JP | 58-30682 U | 2/1983 |
| JP | 61-101593 U | 6/1986 |

(Continued)

OTHER PUBLICATIONS

International Search Report dated Sep. 13, 2016 in PCT/JP2016/070371 filed Jul. 11, 2016.

(Continued)

*Primary Examiner* — Daniel J Wiley
(74) *Attorney, Agent, or Firm* — Oblon, McClelland, Maier & Neustadt, L.L.P.

(57) ABSTRACT

A connecting device connects a first attachment and a second attachment constituting a working machine with each other. The connecting device includes a first connected member, a second connected member, and a connecting member (connecting pin 15). The first connected member extends outward from a first side surface of the first attachment, the first side surface extending in a longitudinal direction of the first attachment. The second connected member extends outward from a second side surface of the second attachment, the second side surface extending in a longitudinal direction of the second attachment, the second connected member facing the first connected member when the first attachment and the second attachment come into a (Continued)

connection state. The connecting member connects the first connected member and the second connected member with each other.

9 Claims, 6 Drawing Sheets

(51) Int. Cl.
*B66C 23/26* (2006.01)
*B66C 23/68* (2006.01)

(56) References Cited

U.S. PATENT DOCUMENTS

| | | | | |
|---|---|---|---|---|
| 3,085,695 | A * | 4/1963 | Miller | B66C 23/70 |
| | | | | 212/300 |
| 3,306,470 | A * | 2/1967 | Green | B66C 23/70 |
| | | | | 212/300 |
| 3,511,388 | A * | 5/1970 | Markwardt | B66C 23/70 |
| | | | | 212/177 |
| 3,572,517 | A | 3/1971 | Liebherr et al. | |
| 4,016,974 | A * | 4/1977 | Tax | B66C 23/283 |
| | | | | 206/321 |
| 5,193,698 | A | 3/1993 | Koizumi | |
| 5,199,586 | A * | 4/1993 | Pech | B66C 23/70 |
| | | | | 212/175 |
| 7,954,657 | B2 * | 6/2011 | Holly | B66C 23/70 |
| | | | | 212/177 |
| 8,839,966 | B2 * | 9/2014 | Walker | B66C 23/26 |
| | | | | 212/175 |
| 2011/0147331 | A1 | 6/2011 | Tanaka et al. | |
| 2014/0131300 | A1 * | 5/2014 | Scampini | B66C 23/34 |
| | | | | 212/300 |

FOREIGN PATENT DOCUMENTS

| | | |
|---|---|---|
| JP | 11-11877 A | 1/1999 |
| JP | 11-165986 A | 6/1999 |
| JP | 2004-18251 A | 1/2004 |
| WO | WO 2010/024151 A1 | 3/2010 |

OTHER PUBLICATIONS

Written Opinion dated Sep. 13, 2016 in PCT/JP2016/070371 filed Jul. 11, 2016.
Extended European Search Report dated Sep. 4, 2018 in Patent Application No. 16824421.8, citing documents AA-AB & AO therein, 8 pages.

* cited by examiner

A-A SECTIONAL VIEW

"B" PART ENLARGED VIEW

CONNECTING DEVICE FOR ATTACHMENTS

TECHNICAL FIELD

The present invention relates to a connecting device for use when a plurality of long attachments, such as struts constituting a working machine such as a crawler crane, are stacked in a vertical direction.

BACKGROUND ART

When a working machine such as a crawler crane is disassembled and stored, or disassembled and transported, a plurality of long attachments such as booms or struts are stacked in a vertical direction and secured so as not to collapse.

Examples of this type of technique include inventions disclosed in Patent Documents 1 and 2 listed below. In Patent Document 1, connecting tools called a fork end and an eye end are respectively secured to respective facing portions of a front mast and a rear mast to be stacked in a vertical direction, and these connecting tools are connected with each other by a pin. In Patent Document 2, lugs are respectively secured to respective facing portions of intermediate booms to be stacked in a vertical direction, and these lugs are connected with each other by a connecting pin.

CITATION LIST

Patent Literature

Patent Document 1: Japanese Unexamined Utility Model Publication No. Sho 61-101593
Patent Document 2: Japanese Unexamined Patent Publication No. 2004-18251

SUMMARY OF INVENTION

A transport height limit has to be kept when a working machine such as a crawler crane is disassembled and loaded on, for example, a trailer and transported. In the case of a large working machine, its attachments are also large. Therefore, there may be a case where it is difficult to transport the attachments in a stacked state when the loading on the trailer is planned in such a way as to keep the transport height limit. In this ease, it has to be planned to transport each attachment separately or to further divide each attachment for the transportation. This increases the transport cost.

Here, the above-described prior art has the following problem. In both of the methods of securing attachments disclosed in Patent Documents 1 and 2, the connecting— such as lugs are secured to the respective facing portions of the attachments to be stacked in the vertical direction, and pinned together. Consequently, the transport height increases by the heights of the connecting tools.

The present invention has been made in view of the above situation, and aims at providing an attachment connecting device capable of reducing, as compared to the conventional technique, the height defined when a plurality of long attachments constituting a working machine are stacked in a vertical direction and secured to each other.

A connecting device according to the present invention connects a first attachment and a second attachment constituting a working machine with each other. The connecting device includes a first connected member, a second connected member, and a connecting member. The first connected member extends outward from a first side surface of the first attachment, the first side surface extending in a longitudinal direction of the first attachment. The second connected member extends outward from a second side surface of the second attachment, the second side surface extending in a longitudinal direction of the second attachment, the second connected member facing the first connected member when the first attachment and the second attachment come into a connection state in which the second attachment is stacked on the first attachment. The connecting member connects the first connected member and the second connected member with each other.

According to the present invention, the first connected member and the second connected member of the connecting device are disposed on the respective side surfaces of the attachments. Therefore, the height of the connecting device has little influence on the height of the plurality of long attachments constituting the working machine, the height being defined when the attachments are stacked in the vertical direction and secured to each other. In other words, the height defined when the attachments are stacked in the vertical direction and secured to each other is reduced as compared to the conventional technique.

DESCRIPTION OF EMBODIMENTS

Hereinafter, embodiments of the present invention will be described with reference to the accompanying drawings. The embodiments described below illustrate a case where an unillustrated luffing jib crane (a crane in which a jib is attached to a distal end of a boom), which exemplifies a working machine, is disassembled and transported. A connecting device of the present invention can be used for cranes of other various forms by being disposed on long attachments constituting a crane when the crane is transported or stored after being disassembled. Examples of the above-mentioned long attachments include struts, jibs, booms, and masts.

First Embodiment

Figure 1:
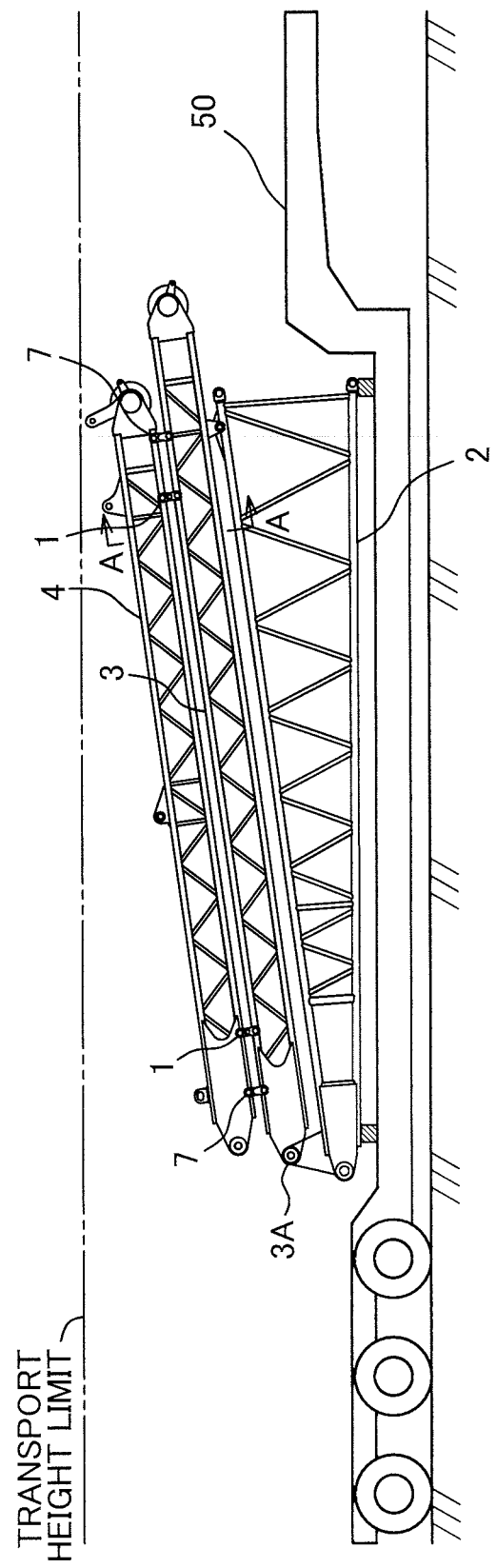
FIG. 1 is side view showing a state in which a plurality of struts stacked in a vertical direction are connected with each other by means of a connecting device according to a first embodiment of the present invention.

FIG. 1 is a side view showing a state in which a plurality of struts stacked in a vertical direction are connected with each other by means of a connecting device according to a first embodiment of the present invention. Long attachments constituting a luffing jib crane are disassembled and loaded on a trailer 50 in the form shown in FIG. 1, for example, to be transported. A lower jib 2 shown in FIG. 1 constitutes a lower portion of a jib attached to a distal end of an unillustrated boom of the luffing jib crane. A front strut 3 shown in FIG. 1 constitutes a first attachment of the present invention, and a rear strut 4 shown in FIG. 1 constitutes a second attachment of the present invention. The front strut 3 and the rear strut 4 are each pivotally attached to a distal end of the jib of the luffing jib crane. In FIG. 1, the front strut 3 attached to the lower jib 2 via a pin 3A is folded on the lower jib 2, and the rear strut 4 is stacked on the front strut 3 so that the lower jib 2, the front strut 3, and the rear strut 4 are transported together by the trailer 50. The state in which the rear strut 4 is stacked on the front strut 3 as shown in FIG. 1 are defined as a connection state of the front strut 3 and the rear strut 4.

The connecting device according to the present invention includes a connecting tool 1. The front strut 3 and the rear strut 4 are connected with each other by the connecting tool 1. It is desirable that a plurality of connecting tools 1 are disposed at predetermined intervals in a longitudinal direction of the struts. In the present embodiment, the connecting tools 1 are disposed on opposite side surfaces of each of opposite ends of the struts in the longitudinal direction. It should be noted that connecting tools 1 are disposed also at corresponding positions on the side surfaces of the struts opposite to the side surfaces shown in the drawing sheet of FIG. 1 (see FIG. 2), and therefore, the four connecting tools 1 in total are disposed in the present embodiment.

In addition, positioners 7 are used to determine the relative position of the front strut 3 and the rear strut 4 in the longitudinal direction when the rear strut 4 is stacked on the front strut 3. Each positioner 7 is disposed on the side surface of the strut and near a corresponding connecting tool 1 (at a predetermined distance from the connecting tool 1). Similarly to the connecting tools 1, the positioners 7 are each disposed on the opposite sides of the struts in a width direction, i.e. a total of four positioners 7 are disposed in the present embodiment. In the present embodiment, the four connecting tools 1 and the four positioners 7 constitute the connecting device.

Figure 2:
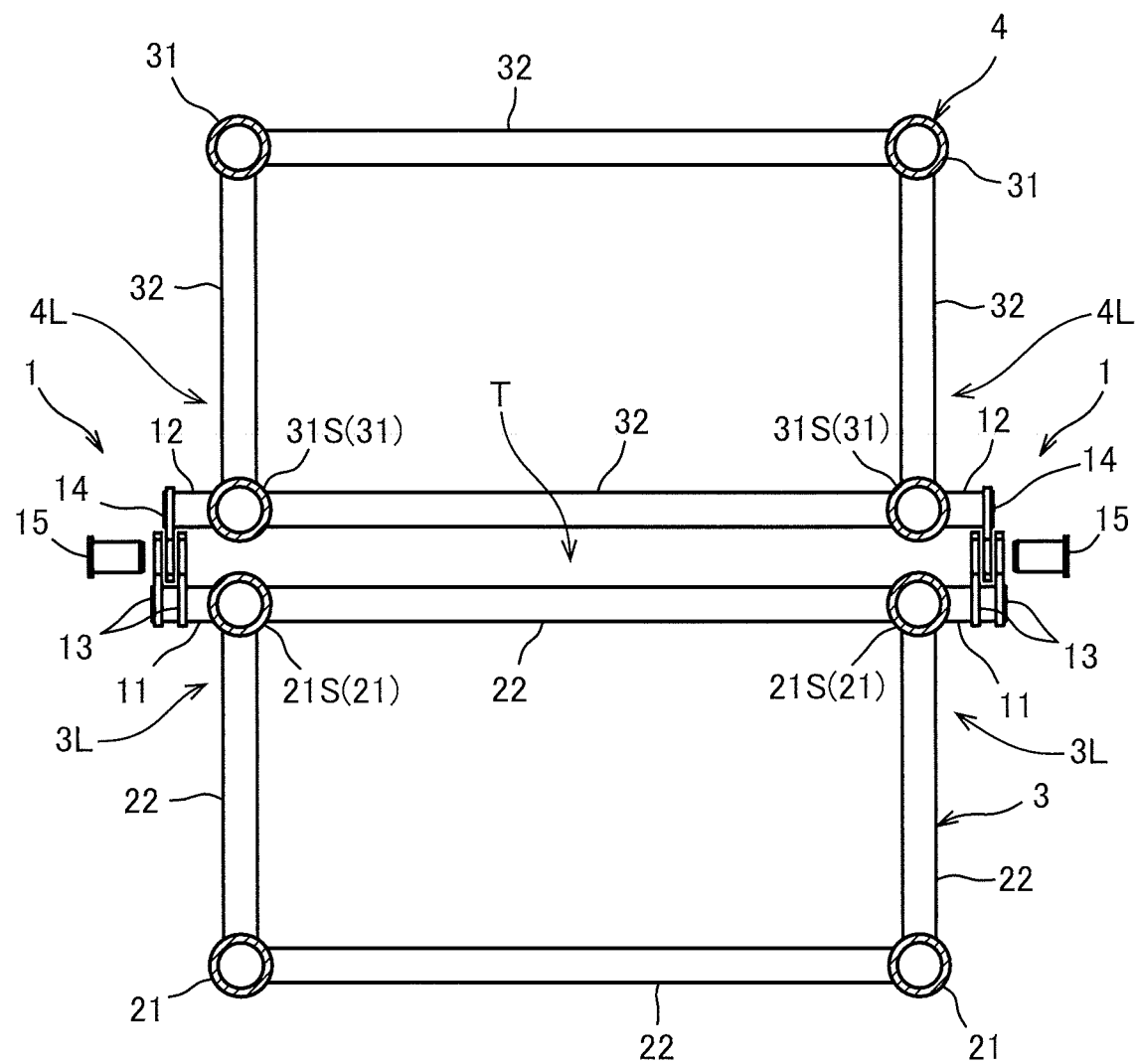
FIG. 2 is a sectional view taken along the line A-A of FIG. 1 with connecting members not attached.

FIG. 2 is a sectional view taken along the line A-A of FIG. 1 with connecting pins 15 described later not attached. The front strut 3 has a lattice structure, and includes four pipe members 21 extending in the longitudinal direction and a plurality of connecting members 22 connecting the pipe members 21, as shown in FIG. 2. Similarly, the rear strut 4 also has a lattice structure, and includes four pipe members 31 extending in the longitudinal direction and a plurality of connecting members 32 connecting the pipe members 31, as shown in FIG. 2.

Figure 3:
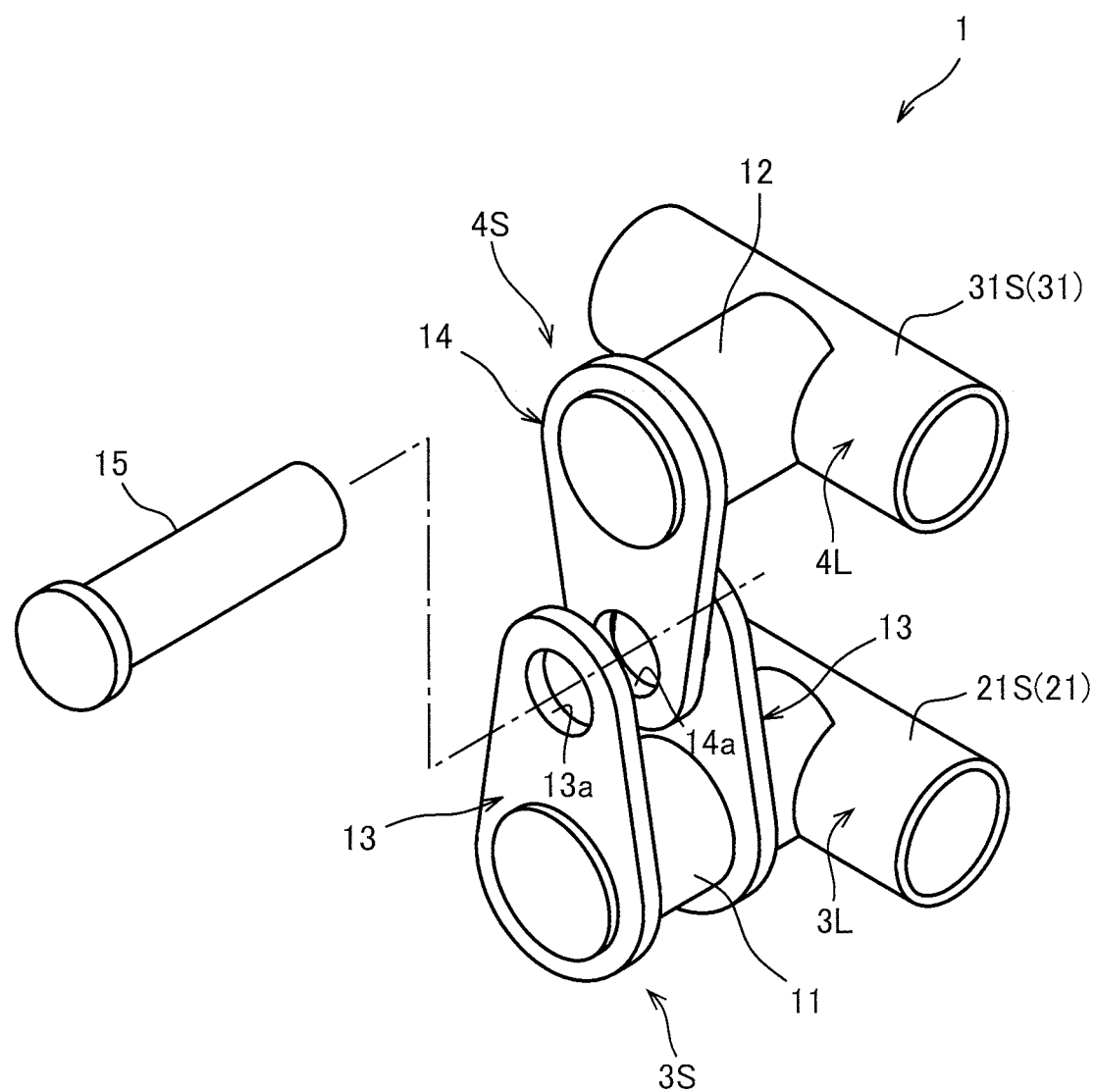
FIG. 3 is a perspective view of a connecting tool of the connecting device shown in FIG. 1.

FIG. 3 is a perspective view of the connecting tool 1 of the connecting device shown in FIG. 1. The connecting tools 1 are disposed on both sides of a facing region T (FIG. 2) defined when the front strut 3 and the rear strut 4 are laid down and stacked in the vertical direction (in the connection state). The connecting tool 1 of the present embodiment includes a first connected member 3S, a second connected member 4S, and the connecting pin 15. The first connected member 3S extends outward from a first side surface 3L (FIGS. 2 and 3) of the front strut 3, the first side surface 3L extending in a longitudinal direction of the front strut 3. The first connected member 3S includes a first connecting support unit 11 having a circular cross-section and a predetermined length, and two first connecting plates 13. The two first connecting plates 13 constitute a first projection of the present invention. The second connected member 4S extends outward from a second side surface 4L (FIGS. 2 and 3) of the rear strut 4, the second side surface 4L extending in a longitudinal direction of the rear strut 4. In addition, the second connected member 4S faces the first connected member 3S when the front strut 3 and the rear strut 4 come into the connection state (FIGS. 1 to 3). The second connected member 4S includes a second connecting support unit 12 having a circular cross-section and a predetermined length, and a second single connecting plate 14. The second connecting plate 14 constitutes a second projection of the present invention. The connecting pin 15 functions as a connecting member for pinning the two first connecting plates 13 and the one second connecting plate 14 from their side. The first connected member 3S, the second connected member 4S and the connecting pin 15 constitute the connecting tool 1 which connects the front strut 3 and the rear strut 4.

The first connecting support unit 11 is disposed on a side surface of one of pipe members 21S (FIGS. 2 and 3) that lie on a side closer to the rear strut 4 in the stacked state among the pipe members 21 constituting the front strut 3, the first connecting support unit 11 extending outward from the side surface of the pipe member 21S. The second connecting support unit 12 is disposed on a side surface of one of pipe members 31S (FIGS. 2 and 3) that lie on a side closer to the front strut 3 in the stacked state among the pipe members 31 constituting the rear strut 4, the second connecting support unit 12 extending outward from the side surface of the pipe member 31S.

The two first connecting plates 13 are spaced from each other and fitted on the first connecting support unit 11 to thereby project upward from the first connecting unit 11. At this time, the two first connecting plates 13 extend upward relative to the front strut 3, as shown in FIG. 2. The second connecting plate 14 is fitted on the second connecting support unit 12 to thereby project downward from the second connecting support unit 12. At this time, the one second connecting plate 14 extends downward relative to the rear strut 4, as shown in FIG. 2. In addition, as shown in FIG. 3, the second connecting plate 14 faces the first connecting plates 13 in a width direction of the rear strut 4 (a direction perpendicularly intersecting the drawing sheet surface of FIG. 1 and a transverse direction of FIG. 2), the width direction intersecting the vertical direction and the longitudinal direction of the rear strut 4. It should be noted that the terms such as "upward" and "downward" refer to directions defined when the rear strut 4 is stacked on the front strut 3 in the laid-down position. When the rear strut 4 is stacked on the front strut 3, the second connecting plate 14 enters the gap between the two first connecting plates 13. The first connecting plate 13 and the second connecting plate 14 are formed with a pin opening 13a and a pin opening 14a, respectively (see FIG. 3). The pin opening 13a and the pin opening 14a pass through the first connecting plate 13 and the second connecting plate 14 in the width direction, respectively. The pin opening 13a and the pin opening 14a constitute a first opening and a second opening of the present invention, respectively. Further, the connecting pin 15 (FIG. 3) has a length sufficient to pass through the pin openings 13a and the pin opening 14a in the width direction (a length sufficient to pass through the pair of pin openings 13a). The connecting pin 15 is fitted in the pin openings 13a and the pin opening 14a in the width direction (see the alternate long and short dash line shown in FIG. 3) to thereby connect the first connecting plate 13 and the second connecting plate 14 with each other in the width direction.

Figure 4:
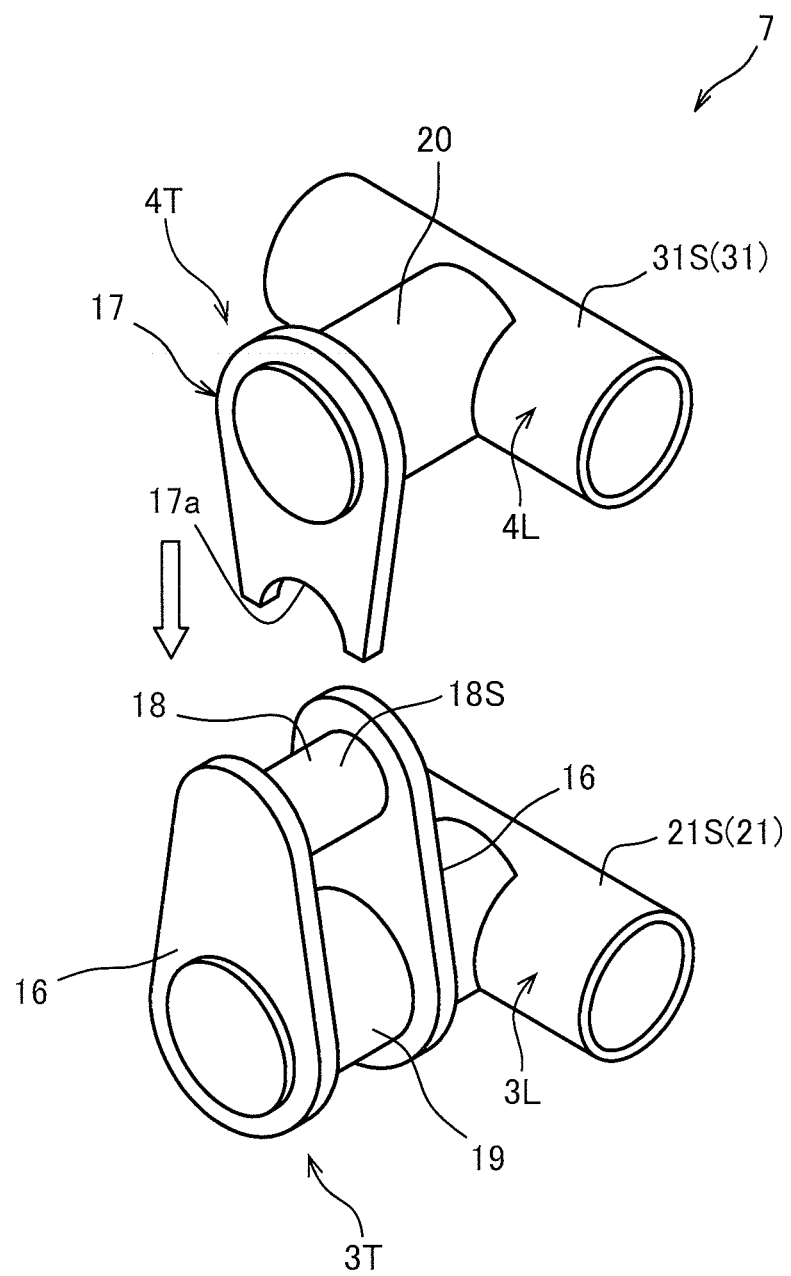
FIG. 4 is a perspective view of a positioner of the connecting device shown in FIG. 1.

FIG. 4 is a perspective view of the positioner 7 of the connecting device shown in FIG. 1. The positioner 7 restricts the relative position of the rear strut 4 with respect to the front strut 3 such that the pin opening 14*a* faces the pin openings 13*a* in the width direction in the connection state. The positioners 7 are, similarly to the connecting tools 1, disposed on both sides of the facing region T (FIG. 2) defined when the front strut 3 and the rear strut 4 are laid down and stacked in the vertical direction. As shown in FIG. 4, the positioner 7 includes a first positioning member 3T and a second positioning member 4T. The first positioning member 3T is disposed on the first side surface 3L of the front strut 3 (FIG. 4). The first positioning member 3T includes a first positioning support unit 19 having a circular cross-section and a predetermined length, two positioning plates 16, and a positioning guide 18 secured between the two positioning plates 16. On the other hand, the second positioning member 4T is disposed on the second side surface 4L of the rear strut 4 (FIG. 4). The second positioning member 4T includes a second positioning support unit 20 having a circular cross-section and a predetermined length, and one engaging plate 17. As mentioned above, the positioner 7 serves as a tool for positioning the pin openings 13*a* of the first connecting plates 13 and the pin opening 14*a* of the second connecting plate 14.

The first positioning support unit 19 is disposed on the side surface of one of the pipe members 21S that lie on the side closer to the rear strut 4 in the stacked state among the pipe members 21 constituting the front strut 3, the first positioning support unit 19 extending outward from the side surface of the pipe member 21S. The second positioning support unit 20 is disposed on the side surface of one of the pipe members 31S that lie on the side closer to the front strut 3 in the stacked state among the pipe members 31 constituting the rear strut 4, the second positioning support unit 20 extending outward from the side surface of the pipe member 31S.

The two positioning plates 16 are spaced from each other and fitted on the first positioning support unit 19 to thereby project upward from the first positioning support unit 19. The engaging plate 17 is fitted on the second positioning support unit 20 to thereby project downward from the second positioning support unit 20. When the rear strut 4 is stacked on the front strut 3, the engaging plate 17 enters the gap between the two positioning plates 16. The positioning guide 18 has a cylindrical shape extending in a width direction of the front strut 3. Further, an arc-shaped recess 17*a* is formed at an end of the engaging plate 17. The recess 17*a* faces an outer circumferential surface 18S of the positioning guide 18 in the vertical direction when the front strut 3 and the rear strut 4 come into the connection state. An inner surface of the recess 17*a* and the outer circumferential surface 18S of the positioning guide 18 have the same diameter so that they come into surface contact with each other.

When the rear strut 4 is stacked on the front strut 3, the recess 17*a* of the engaging plate 17 is placed on the positioning guide 18. In other words, the recess 17*a* of the engaging plate 17 and the outer circumferential surface 18S of the positioning guide 18 engage with each other. Consequently, the rear strut 4 rides on (is laid on) the front strut 3, and the relative position of the rear strut 4 with respect to the front strut 3 in the longitudinal direction of the front strut 3 and the vertical direction is restricted. As a result, the pin openings 13*a* and the pin opening 14*a* meet each other, so that these openings agree with each other in side view. The components of each positioner 7 are disposed on the respective side surfaces of the struts such that the pin openings 13*a* and the pin opening 14*a* come into the above-mentioned positional relationship when the front strut 3 and the rear strut 4 come into the connection state. In addition, in the connection state, the outer circumferential surface 18S of the positioning guide 18 and the recess 17*a* of the engaging plate 17 come into contact with each other by a weight of the rear strut 4 to thereby restrict the relative positions of the pin openings 13*a* and the pin opening 14*a* in the vertical direction. When the connecting pin 15 is driven into the pin openings 13*a* and the pin opening 14*a* by a worker, the front strut 3 and the rear strut 4 stacked in the vertical direction are connected with each other. Consequently, the rear strut 4 is prevented from falling down from the front strut 3.

Second Embodiment

Figure 5:
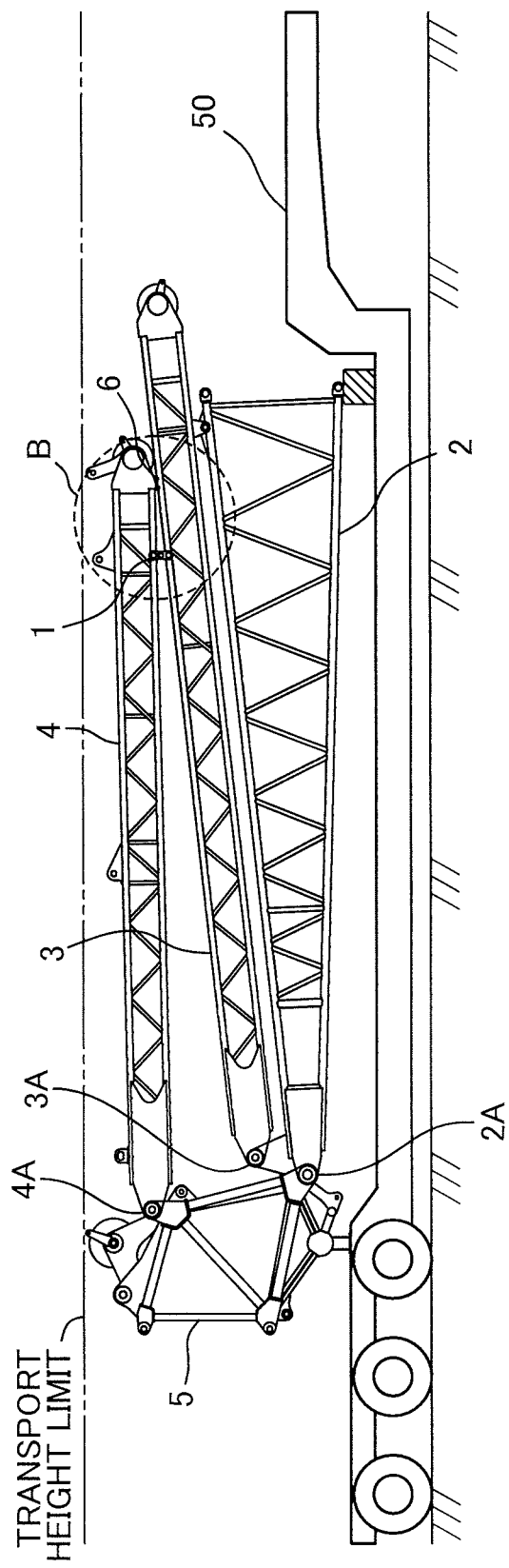
FIG. 5 is a side view showing a state in which a plurality of struts stacked in a vertical direction are connected by means of a connecting device according to a second embodiment of the present invention.
Figure 6:
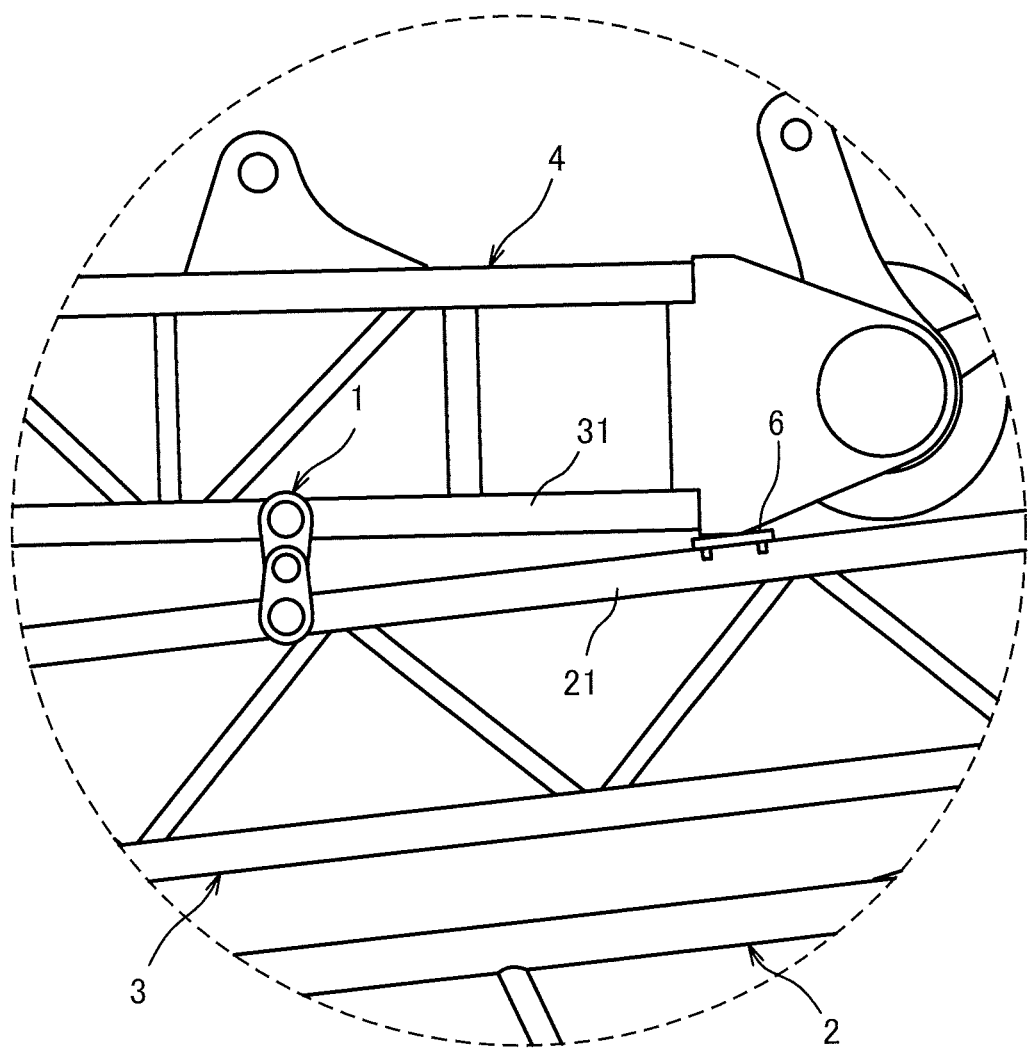
FIG. 6 is an enlarged view of a "B" part shown in FIG. 5.

FIG. 5 is a side view showing a state in which a plurality of struts stacked in a vertical direction are connected by means of a connecting device according to a second embodiment of the present invention. FIG. 6 is an enlarged view of a "B" part shown in FIG. 5. In the description of the second embodiment hereinafter, components and members identical to those described in the first embodiment are denoted by the same respective reference numerals as in the first embodiment as shown in, for example, FIG. 1.

An upper boom 5 shown in FIG. 5 constitutes an upper portion of a boom of an unillustrated luffing jib crane. In the second embodiment, a lower jib 2, a front strut 4, and a rear strut 4 connected to the upper boom 5 via pins 2A, 3A, and 4A, respectively, are transported together by a single trailer 50.

A connecting device shown in the second embodiment includes a pair of connecting tools 1 disposed on opposite side surfaces of the struts in a width direction, and a pair of receiving plates 6 secured on a top surface of the front strut 3 at a predetermined distance from the connecting tools 1 in a longitudinal direction of the struts. The receiving plates 6 each constitute a receiving member of the present invention.

One of the receiving plates 6 is secured on a top surface of one of pipe members 21 that lie on a side closer to the rear strut 4 in the stacked state among pipe members 21 constituting a front strut 3. The other of the receiving plates 6 is disposed at a corresponding position on a top surface of a pipe member 21 opposite to the pipe member 21 shown in the drawing sheets of FIGS. 5 and 6.

Each receiving plate 6 is preliminarily secured on a portion of the top surface of the pipe member 21 of the front strut 3, the portion coming into contact with a distal end of the rear strut 4 when the rear strut 4 pinned on the upper boom 5 is pivoted down about its pinned portion (pin 4A). Consequently, when the rear strut 4 is folded to come into the connection state, the distal end of the rear strut 4 comes into contact with the receiving plates 6 from above. Therefore, the pipe members 21 constituting the front strut 3 are prevented from being damaged. The front strut 3 and the rear strut 4 are connected with each other by the pin 4A via the upper boom 5, and also by the connecting tools 1 shown in FIG. 3. In other words, the front strut 3 and the rear strut 4 are connected with each other at two positions of each strut in the longitudinal direction. Consequently, it is possible to reliably prevent the rear strut 4 from falling down from the front strut 3 during the transport.

(Modifications)

As shown in, for example, FIG. 3, in the above-described embodiments, the second connecting plate 14 is placed in the gap between the two first connecting plates 13. Alternatively, only a single first connecting plate 13 and a second connecting plate 14 may be connected with each other by a connecting pin 15.

In place of the above-mentioned connecting pin 15, a bolt and a nut, for example, may be used to connect and secure the first connecting plates 13 and the second connecting plate 14 with each other.

The positioning member 7 is not necessarily disposed near the connecting tool 1.

The positioner 7 may be configured, instead of disposing the positioning guide 18 on the side of the front strut 3 and the engaging plate 17 on the side of the rear strut 4, such that the engaging plate 17 is disposed on the side of the front strut 3, and the positioning guide 18 is disposed on the side of the rear strut 4.

It may be configured such that only a single positioning plate 16 is provided.

It may be configured such that the engaging plate 17 extends further downward than as shown in FIG. 4 and the inner diameter of the recess 17a is made to correspond to the outer diameter of the first positioning support unit 19, without providing the positioning guide 18. Such configuration allows the recess 17a of the engaging plate 17 to engage with the outer circumferential surface of the cylindrical first positioning support unit 19. In this case, the first positioning support unit 19 constitutes the outer circumferential surface of the first positioning member 3T, the outer circumferential surface being engageable with the recess 17a of the engaging plate 17.

Regarding the second embodiment shown in FIGS. 5 and 6, the receiving plates 6 may be omitted. However, it is preferred to provide the receiving plate 6 being able to receive the distal end of the rear strut 4 when the rear strut 4 is laid down on the front strut 3. Consequently, it is possible to prevent the front strut 3 from being damaged.

Struts (attachments) to be connected with each other may have a box structure (a structure in which four plates constitute a cross section) instead of a lattice structure. It should be noted, however, that the lattice structure makes it possible to obtain greater rigidity and strength with a light weight than the box structure.

(Operation and Effects)

According to the present invention, the connecting tool of the connecting device is disposed on the respective side surfaces of the long attachments (for example, struts). The height of the connecting tool has little influence on the height of a plurality of long attachments constituting a working machine (for example, a crane) defined when they are stacked in the vertical direction and secured to each other. In other words, the present invention makes it possible to reduce the height defined when attachments are stacked in the vertical direction and secured to each other as compared to the conventional technique. Consequently, it is possible to reduce the transport height defined when the attachments are stacked in the vertical direction for transportation. This makes it possible, in the case of a large crane, to transport more attachments together (allows integral transport of attachments). Consequently, it is possible to reduce the number of trailers and, in turn, reduce the transport cost. From another perspective, because the transport height can be reduced as compared to the conventional technique, it is possible to allow the attachments (for example, struts) to have a large frame size within a range not exceeding a transport height limit. Consequently, the attachments are allowed to have greater rigidity and strength than in the conventional technique.

Further, in the present invention, it is preferred to configure the connecting member for connecting the first connecting support unit 11 and the second connecting support unit 12 with each other by the first connecting plates 13 projecting upward from the first connecting support unit 11, the second connecting plate 14 projecting downward from the second connecting support unit 12, and the rod-like connecting member (for example, the connecting pin 15) for connecting the first connecting plates 13 and the second connecting plate 14 from their side. According to this configuration, it is possible to reduce the height of the attachments stacked in the vertical direction and more reliably prevent contact between the attachments.

As shown in the first embodiment, it is preferred to provide the positioner 7 disposed on the side surfaces of the attachments to position the pin opening 13a (first opening) which is formed in the first connecting plate 13 and to which the connecting pin 15 (connecting member) is inserted and the pin opening 14a (second opening) which is formed in the second connecting plate 14 and to which the connecting pin 15 (connecting member) is inserted. This configuration facilitates the positioning of the pin openings (the first opening and the second opening).

Further, the positioner 7 is preferred to include a first positioning member (for example, the positioning guide 18) disposed on the side of one of the attachments to be stacked, and a second positioning member (for example, the engaging plate 17) disposed on the other of the attachments to be stacked and formed with a recess engageable with the first positioning member. This allows a simple configuration of the positioner 7.

Further, in the above-described embodiments, the connecting support units 11 and 12 of the connecting tool 1 and the positioning support units 19 and 20 of the positioner 7 have the same shape and dimension. In addition, the connecting plates 13 and 14 of the connecting tool 1 have similar shapes to the positioning plate 16 and the engaging plate 17 of the positioner 7. In this manner, the present invention allows standardization of components, which makes it possible to reduce the cost.

Further, as shown in the first embodiment, it is preferred to provide the plurality of connecting tools 1 at predetermined intervals in the longitudinal direction of the attachments as shown in the first embodiment. The attachments are more reliably secured during the transport by being connected with each other at several points in the longitudinal direction of the attachments.

Further, as shown in the second embodiment, it is preferred to secure the receiving plate 6 on the top surface of the first attachment, which constitutes the lower attachment, at a predetermined distance from the connecting tool 1 in the longitudinal direction of the attachments, the receiving plate 6 allowing the longitudinal end of the second attachment, which constitutes the upper attachment, to come into contact therewith from above. This configuration makes it possible to prevent the attachments from being damaged due to contact therebetween.

The embodiments and the modifications of the present invention have been described above. It is needless to say that other various modifications can be made within the scope of ordinary creativity of a person skilled in the art.

The invention claimed is:

1. An attachment connecting device for connecting a first attachment and a second attachment constituting a working machine with each other, comprising, a pair of first connected members disposed on opposite first side surfaces of the first attachment in a width direction intersecting a vertical direction and a longitudinal direction of the first attachment and extending outward from the first side surfaces of the first attachment in the width direction, the first side surfaces extending in the longitudinal direction of the first attachment;

a pair of second connected members disposed on opposite second side surfaces of the second attachment in the width direction intersecting a vertical direction and a longitudinal direction of the second attachment and extending outward from the second side surfaces of the second attachment in the width direction, the second side surfaces extending in the longitudinal direction of the second attachment, the second connected members facing the first connected members when the first attachment and the second attachment come into a connection state in which the second attachment is stacked on the first attachment; and a pair of connecting members for connecting the first connected members and the second connected members with each other.

2. The attachment connecting device according to claim 1, wherein:

each of the first connected members includes a first projection extending upward relative to the first attachment in the connection state;

each of the second connected members includes a second projection extending downward relative to the second attachment and facing the first projection in the width direction of the second attachment in the connection state; and each of the connecting members connects the first projection and the second projection with each other in the width direction.

3. The attachment connecting device according to claim 2, wherein:

the first projection of each of the first connected members is formed with a first opening passing through the first projection in the width direction;

the second projection of each of the second connected members is formed with a second opening passing through the second projection in the width direction;

each connecting member has a length sufficient to pass through the respective first opening and second opening in the width direction, and is fitted in the respective first opening and second opening in the width direction to thereby connect the respective first projection and the second projection with each other.

4. The attachment connecting device according to claim 3, further comprising:

a positioner for restricting a relative position of the second attachment with respect to the first attachment such that the second opening of one of the second connecting members faces the respective first opening in the width direction in the connection state.

5. The attachment connecting device according to claim 4, wherein the positioner includes a first positioning member disposed on one of the first side surface of the first attachment and the second side surface of the second attachment; and a second positioning member disposed on the other of the first side surface of the first attachment and the second side surface of the second attachment, and engageable with the first positioning member to thereby restrict the relative position of the second attachment with respect to the first attachment.

6. The attachment connecting device according to claim 5, wherein:

the first positioning member has an outer circumferential surface extending in the width direction;

the second positioning member has a recess facing the outer circumferential surface of the first positioning member in the vertical direction in the connection state; and the outer circumferential surface of the first positioning member and the recess of the second positioning member engage with each other to thereby restrict the relative position of the second attachment with respect to the first attachment in the longitudinal direction of the first attachment and the vertical direction in the connection state.

7. The attachment connecting device according to claim 6, wherein the outer circumferential surface of the first positioning member and the recess of the second positioning member come into contact with each other by a weight of the second attachment to thereby restrict the relative position of the second opening with respect to the first opening in the vertical direction in the connection state.

8. The attachment connecting device according to claim 1, wherein the first connected members, second connected members, and connecting members are disposed at a predetermined interval in the longitudinal directions of the first attachment and the second attachment.

9. The attachment connecting device according to claim 1, further comprising a receiving member secured on a top surface of the first attachment at a predetermined distance from one of the first connected members in the longitudinal direction of the first attachment for allowing the second attachment to come into contact therewith from above in the connection state.

* * * * *